United States Patent Office 3,241,062
Patented Mar. 15, 1966

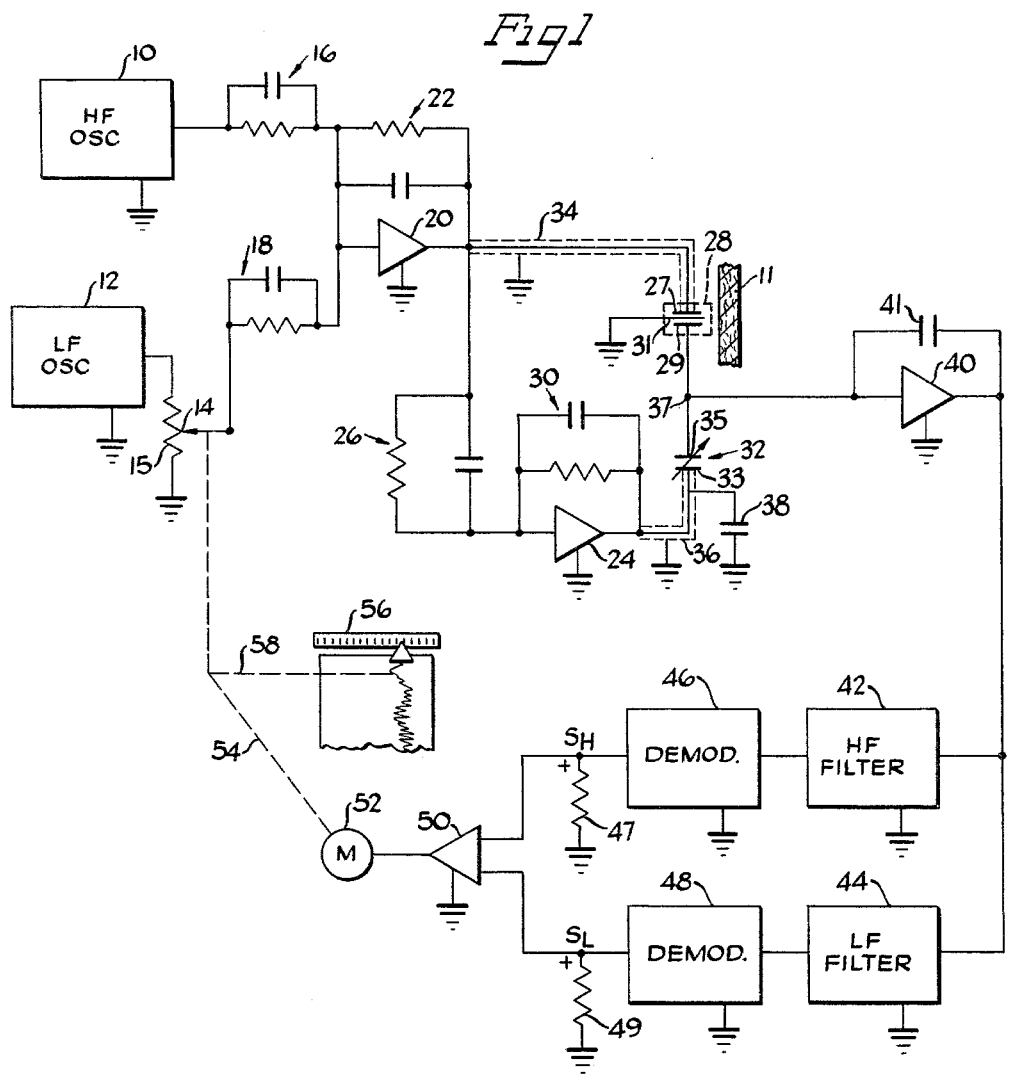

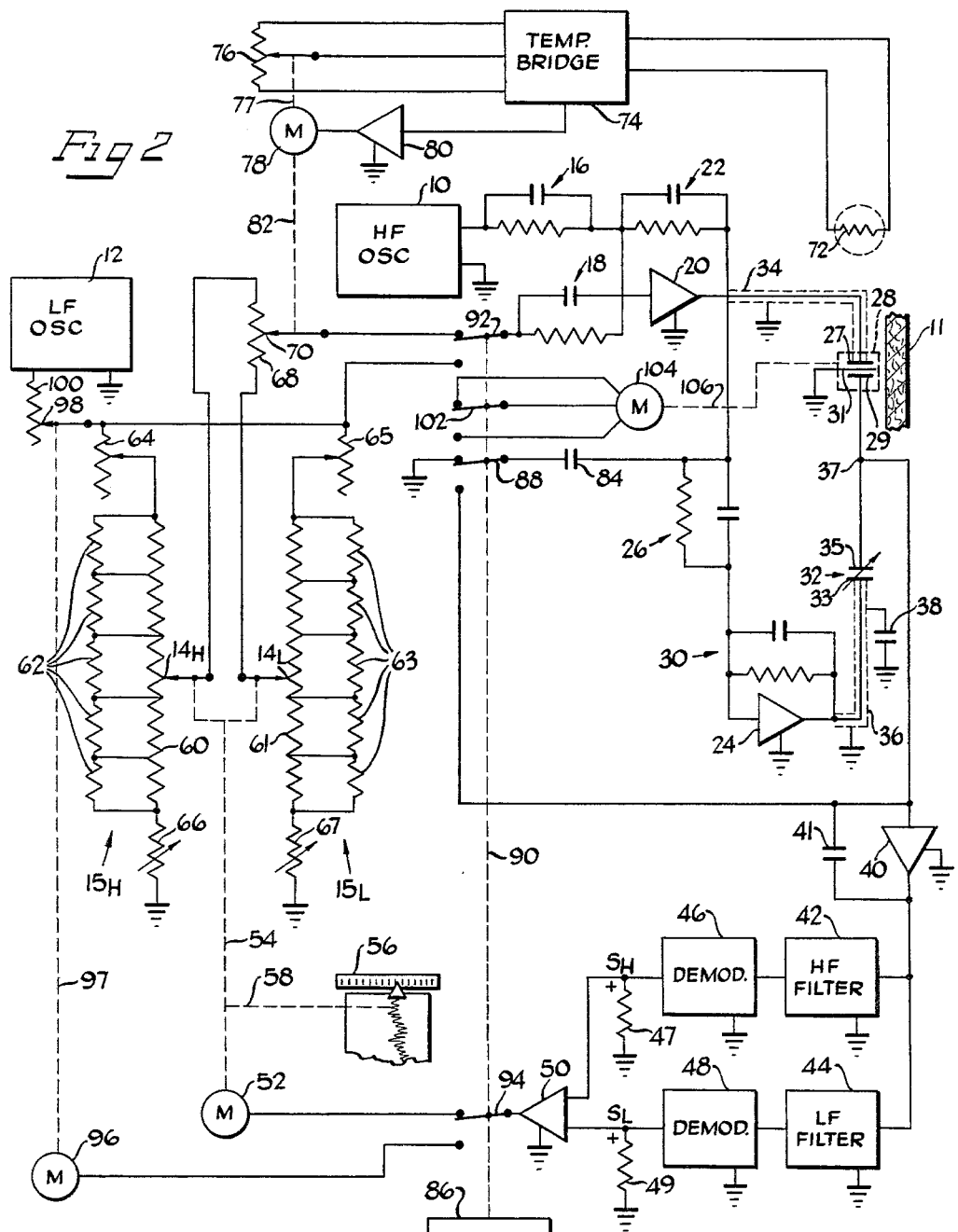

3,241,062
COMPUTER SYSTEM FOR TWO-FREQUENCY DI-ELECTRIC MATERIALS GAUGE WITH STANDARDIZATION AND TEMPERATURE SENSOR INPUT
Clyde W. Baird, Columbus, Ohio, assignor to Industrial Nucleonics Corporation, a corporation of Ohio
Filed Feb. 18, 1963, Ser. No. 259,116
14 Claims. (Cl. 324—61)

This invention relates generally to a measurement system having a plurality of signals at different frequencies applied to a capacitance probe, and specifically to a simplified detector circuit for use in such a system.

The present invention is an improvement on the system described in the copending application Serial No. 41,975, filed July 11, 1960, for "Measuring System," by Albert F. G. Hanken, now Patent No. 3,155,900. In that system the capacitance probe forms part of a bridge circuit. The probe includes as a dielectric the material to be measured in an industrial process. The bridge is simultaneously supplied with a pair of signals at separate frequencies, that is, the capacitive arms of the bridge have applied at their outer terminals balanced voltages at widely displaced frequencies. There is produced across the bridge a pair of signals at the respective frequencies but at an amplitude varying in accordance with the unbalance of the bridge at each frequency. The unbalanced signals are amplified in a wideband amplifier and then applied to a pair of filters. One filter is adapted to select the signal at the first frequency and pass it to a first detector. The output of the first detector is a D.C. signal of a magnitude varying in accordance with the amplitude of the signal at the first frequency. In a similar manner the other filter is adapted to select the signal at the second frequency and pass it to a second detector. The output of the second detector is a D.C. signal of a magnitude varying in accordance with the amplitude of the signal at the second frequency. The two signals at the output of the two detectors are then applied to a computer for indicating a response relating to a qualitative or quantitative property of the material in the capacitance probe, in particular its moisture content.

In the system of the present invention, the signals at the output of the two detectors are maintained at the same ratio, preferably unity, by appropriate control of one of the input signals. An important advantage of the invention is that it reduces the dynamic range required of the output amplifier. The low frequency signal transmission increases more rapidly with moisture than the high frequency signal does. An amplifier suitable for handling the high frequency signal would require a very wide dynamic range to handle the low frequency signal without overloading. The difference in the signals may be larger than 100:1. By reducing the low frequency input signal in such manner as to maintain a 1:1 ratio of high frequency signal to low frequency signal at the amplifier irrespective of variations in the property being measured, the dynamic range requirement is reduced usually by a factor of 10 or more.

The one input signal is preferably controlled by a potentiometer operated by a servo system to maintain the signal ratio constant. The property being measured, the moisture content of the material, may then be read out on a calibrated scale by an indicator moving with the potentiometer adjustment.

In some operations there are wide variations in temperature at the measuring probe. This may often change the calibration of the system. In such instances, a temperature compensated form of the invention may be used.

In this form of the invention, two calibrations are used, one at high temperature and one at low temperature. Part of each calibration is selected by a temperature responsive system.

Further, the calibration may vary with time during operation. Provision is made for automatic calibration, by periodically withdrawing the probe from the material and switching a standard load across the probe, comparable to a particular condition being measured, and automatically varying one of the signal generators to provide a predetermined bridge output condition.

Accordingly, it is a primary object of the present invention to provide a new and improved dual frequency measurement system, most particularly for measuring the moisture content of material.

Another object of the present invention is to simplify the measurement circuitry in a dual frequency measurement system.

Still another object of the present invention is to provide a dual frequency measurement system in which one of the input signals is varied in amplitude to maintain a constant ratio of output signals.

A further object is to provide for temperature compensation of a dual frequency measurement system.

A still further object is to provide for automatic standardization of a dual frequency measurement system.

Other objects and features of the present invention will become apparent from the following detailed description when taken in conjunction with the drawings, in which:

FIGURE 1 shows a preferred embodiment of the dual frequency measuring system of this invention; and FIGURE 2 shows a modified form of the invention of FIGURE 1, including temperature compensation and automatic standardization.

Referring now to the drawings, FIGURE 1 shows a system for measuring the moisture content of a material 11, which may be paper, for example. A pair of oscillator generators 10 and 12 are operative to produce a pair of signals. These signals are at widely displaced frequencies and are referred to hereinafter as the high and low frequency signals, respectively.

In certain measurements, it has been found convenient and desirable to use frequencies of 500 and 100 kilocycles, respectively. The output of one of the generators, preferably that of the low frequency oscillator, as shown, is taken from a tap 14 on a potentiometer or voltage divider 15 in order that the magnitude of the signal therefrom can be varied by variation of the potentiometer setting. Except where the context indicates otherwise, the output signal of low frequency oscillator 12 will be considered herein as the signal appearing at tap 14. The signals are applied to an A.C. feedback amplifier 20 through respective input impedances 16 and 18.

Amplifier 20 is capable of amplifying both frequencies and does not include tuned elements. In this way the amplifier 20 can accommodate any frequency within a given range without requiring bridge adjustments. The voltage capability of the amplifier 20 must be the peak to peak voltage swing of the low frequency signal required by the bridge plus the peak to peak voltage swing of the high frequency signal. This amplifier, although capable of high gain, is preferred to be operated at a gain of unity with feedback. Feedback is by means of impedance 22 and provides a low output impedance and good gain stability. The amplifier 20 is preferably used as a type of A.C. summing amplifier. In this way the two frequencies may be fed simultaneously to the bridge without frequency acceptor or rejector circuits that would normally be required to prevent one frequency source from loading the other. In the preferred form of this invention, impedances 16, 18 and 22 are like, although not necessarily of equal value; the signals at the output of amplifier 20 are then of opposite phase from the output signals from oscillators 10 and 12, and are equal to the sum of the oscillator signals each divided by the ratio of the respective input impedances 16 or 18 to the feedback impedance 22.

The combined signals from amplifier 20 are applied to a first input terminal connected to a plate 27 of the capacitance probe 28. The probe 28 preferably comprises a fringe field capacitor having a second plate 29 and a grounded guard electrode 31 between the plates. The material 11 being measured forms a part of the dielectric of the capacitance probe 28.

The combined signals in addition to being fed to the capacitance probe 28 are also fed through input impedance 26 into a phase inverter amplifier 24. This provides combined signals of phase opposite to the combined signals applied to the capacitance probe 28. The combined signals of opposite phase are applied to a second input terminal connected to a plate 33 of balancing capacitor 32. The other plate 35 of capacitor 32 is connected at measuring terminal 37 to the plate 29 of the capacitance probe 28. This completes a bridge circuit. Signals of one phase are applied between ground (as a reference datum) and plate 27 of capacitance probe 28 and signals of opposite phase are applied between ground and plate 33 of capacitor 25. The output of the bridge circuit is taken between measuring terminal 37 and ground and is applied to output amplifier 40.

The amplifier 24 is preferably like amplifier 20 and has a similar fedback impedance 30; preferably impedances 26 and 30 are identical. The output of amplifier 24 will then be equal to the input to impedance 26 but of opposite phase. The signals applied to the outer plates 27 and 33 of capacitance probe 28 and balancing capacitor 32 are therefore equal and opposite. Capacitor 32 is adjusted to equal the capacitance of probe 28 when material 11 is absent from the probe, and the bridge is then balanced at both frequencies as may be observed at the measuring terminal.

The bridge may also be balanced at other values of balancing capacitor 32 by changing the relative magnitude of impedances 26 and 30. That is, if the impedance of impedance 26 is, for example, three times that of impedance 30, the phase inverter steps the signal down by a factor of three. Balance may then be achieved by making the balancing capacitor 32 three times larger. In either case, with the bridge balanced, any change in the output of amplifier 20, as may be occasioned by changes in the amplifier 20 or its input from oscillators 10 and 12, will result in a balancing change in the oppositely phased output of amplifier 24. Thus, the bridge automatically remains at a given balance.

Although impedances 26 and 30 are shown as parallel capacitors and resistors, they may also be pure capacitors or resistors. The important criterion is that both of the impedances be like. They need not be equal but they should introduce substantially the same phase shift at each frequency. The current through the input impedance 26 flows through the feedback impedance 30 with no current flowing into the amplifier itself. In this case, if the impedances are like, the voltage at the output of the amplifier is of opposite phase from the input voltage but equal to the input voltage divided by the ratio of the input impedance to the feedback impedance. This ratio should be real at all frequencies; that is, the feedback impedance should be substantially like the input impedances, although its magnitude may be greater or smaller, in order that it not introduce appreciable phase shift in addition to the 180° phase shift of the amplifier 24. As used herein, like does not necessarily imply the same magnitude.

The probe 28 and the balancing capacitor 32, which is preferably located at the probe, are frequency located physically at some distance from the rest of the system. That is, the probe may be small and must be at the material being measured. The more bulky apparatus is more conveniently disposed out of the way of the process being observed. To reduce stray signals, the leads to the probe and the balancing capacitor are preferably shielded with grounded shields 34 and 36. A capacitor 38 may be connected between plate 33 and ground. The circuit for developing and applying the phase reversed signals may be as described in greater detail in the copending application of Alan Norwich, Serial No. 174,748, filed February 21, 1962, for "Measuring System."

As an illustration of the operation of the present invention, moisture measurement is considered. With the bridge balanced as above and with equal signals applied at each frequency, when the material 11 contains no moisture, the high frequency signals ($S'_H$) developed at terminal 37 will be of the same amplitude as the low frequency signal ($S'_L$); that is, $S'_H = S'_L$. If moisture were to be introduced into the material 11, the low frequency signal would increase more than the high frequency signal ($S'_L > S'_H$). However, if only the mass of the material were to be increased, both the high and the low frequency signals would increase, but the ratio of the one signal to the other would remain constant.

The signals of both frequencies developed at terminal 37 are applied to the amplifier 40 which may have a feedback loop through a capacitor 41. The output amplifier 40 acts as an A.C. summing amplifier and applies the added signals to high and low frequency filters 42 and 44, respectively, if necessary, with additional amplification. As in the system described in the aforesaid Hanken application, Serial No. 41,975, these filters 42 and 44 separate the high frequency signal from the low frequency signal and apply the separate signals to demodulators 46 and 48, respectively, which derive separate D.C. signals $S_H$ and $S_L$ each corresponding to a respective one of said high and low frequency signals $S'_H$ and $S'_L$ appearing at terminal 37. As explained in greater detail in the aforesaid Hanken application and in the copending application of Gordon William Walls, Serial No. 238,838, filed November 16, 1962, for "Method and Apparatus for Determining Moisture Content of Dielectric Materials," now Patent No. 3,155,902, although each of these signals is systematically related to the signals applied from a respective signal generator and to the mass of the material the ratio of these signals ($S_L/S_H$) is indicative of moisture content of the material 11. In the present invention, this ratio is not measured directly but by a servo system that maintains this ratio constant, preferably at unity. The output circuits of the demodulators, including respective resistors 47 and 49, could be adjusted to provide different gain for the two signals and hence a different constant ratio could be maintained, but it is preferred that the gains be the same and the ratio maintained at unity.

To achieve this, the outputs of the demodulators may be applied to a servo amplifier 50, which acts in a conventional manner to produce an output of amplitude and polarity dependent upon the difference between the two D.C. signals, i.e., $S_L - S_H$. The output of amplifier 50 drives servo motor 52 which mechanically through linking means 54 (which may be a shaft) moves the tap 14 to vary the output of the low frequency oscillator 12. Depending upon whether the low frequency signal $S_L$ is lesser or greater than the high frequency signal $S_H$, the polarity of the output of servo amplifier 50 is such as to cause the motor 52 to rotate so as to move the tap 14 up or down, respectively, thus increasing or decreasing the output of low frequency oscillator 12 as necessary to reduce the difference between the two D.C. signals. So long as the two signals are different, the tap is moved. When the two signals are equal, the servo system is balanced, and the tap 14 is at that point on the slidewire that provides the appropriate amplitude of the output of the low frequency oscillator to produce this balance. The position of the tap is indicative of this output and is likewise indicative of moisture, as will now be shown.

As in the case of the system disclosed in the aforesaid Hanken application Serial No. 41,975, the ratio of $S_L$ to $S_H$ is indicative of the moisture content of the material being measured. In the Hanken system, the outputs of the two oscillators were of equal amplitude. Were the output of the low frequency oscillator to be doubled, the ratio of $S_L$ to $S_H$ would be doubled. Hence, if the moisture content of the material were to change so as to cause the ratio of $S_L$ to $S_H$ to change from unity to two, the output of oscillator 12 could be reduced by a factor of two to return the ratio to unity. This is automatically done by the system of FIGURE 1, and the position of the tap 14 is the reciprocal of the ratio of $S_L$ to $S_H$ that would have existed had the oscillators had the same output, as in the Hanken system. A read-out device 56 may be coupled to the tap by linkage means 58 so as to read out the tap position and hence moisture content. The particular relationship between tap position and the read-out scale is determined by the particular way in which the potentiometer 15 is wound. The system can thus be calibrated to read out moisture content directly.

In FIGURE 2 is shown a modified form of the invention with provision for temperature compensation and automatic standardization or calibration. The basic system is the same as the system shown in FIGURE 1 and like parts are given like identifying numbers. The principal difference is in the potentiometer 15, which has been modified to provide for temperature compensation. As noted above, the particular way in which the potentiometer 15 is wound determines the relationship between the read-out scale and the tap position. This provides an appropriate relationship between scale indication and the moisture content. In some instances the measuring system does not provide the same balancing conditions at all temperatures for the same moisture content. Under such conditions, the apparatus of FIGURE 1 would balance at different positions of the tap 14, when the temperature varied substantially, and the indication on the read-out scale would change and provide an erroneous reading.

To prevent such changes in indication, potentiometer 15 is made in two parts, $15_H$ and $15_L$. Potentiometer $15_H$ is comprised of a slide wire 60 having padding resistors 62 connected across parts thereof to give the potentiometer the appropriate characteristic at a high temperature, preferably somewhat higher than the highest temperature ordinarily encountered in the measurements being made. Variable resistors 64 and 66 are used to adjust the upper and lower limits of the variations of the potentiometer, thus setting the range of the measurements. Were the system to operate at the aforesaid high temperature, a tap $14_H$ on potentiometer $15_H$ would adjust just as described above for tap 14 in conjunction with FIGURE 1 and proper indication of moisture would be read out on device 56. Similarly, potentiometer $15_L$ is comprised of a slide wire 61, padding resistors 63 and variable resistors 65 and 67 which provide the appropriate potentiometer for a low temperature, preferably somewhat lower than the lowest temperature ordinarily encountered in the measurements being made. Tap $14_L$ would similarly adjust to the appropriate position for the aforesaid low temperature. Taps $14_L$ and $14_H$ are mechanically moved as a unit by linking means 54. Thus the signal from tap $14_L$ is appropriate at the low temperature, and the signal from tap $14_H$ is appropriate at the high temperature, and signals somewhere in between are appropriate at temperatures in between.

To approximate the appropriate characteristic for temperatures in between, potentiometer 68 is connected between taps $14_H$ and $14_L$ to pick off the appropriate part of the signals from each. That is, at high temperatures tap 70 moves near the end connected to tap $14_H$ to pick off more of the signal at tap $14_H$ and hence less of the signal at tap $14_L$. At low temperatures, the tap 70 moves near the other end to pick off more of the signal at tap $14_L$. To control the position of tap 70 in response to temperature, sensor 72, which may be a temperature sensitive resistor, is placed in the vicinity of the measurement probe 28 and the material 11 being measured. The temperature sensor is connected to a measuring device which is preferably a self-balancing temperature bridge 74, having a balancing potentiometer 76 operated through means 77, such as a shaft, by a servo motor 78 which in turn is operated by the output of servo amplifier 80 which amplifies the unbalance of the temperature bridge. In a conventional manner, the bridge 74 adjusts itself to balance where the position of the shaft 77 indicates temperature. At the same time the shaft 77 is connected to means 82, which may also be a shaft, which is connected to tap 70.

Thus, as temperature at the probe varies, tap 70 is moved to pick off the appropriate signal to pass to the measuring probe. The read-out device 56 then reads correctly even though the temperature varies.

In order to calibrate or standardize the system, a capacitor 84 is placed across the probe capacitance 28 in lieu of the material 11. This standard capacitor preferably has capacitance equivalent to the change in probe capacitance with material ordinarily at the probe during measurement. Under these conditions, the output signals $S_H$ and $S_L$ should be equal with equal input signals from oscillators 10 and 12, provided the system responds the same at all frequencies. In other words the system should balance at the full output of potentiometer 15. In the event the system is not so balanced, the input of potentiometer 15 should be changed to balance the system. It is preferable to calibrate or standardize the system from time to time. To this end, a timer 86 is connected to operate a switch 88 periodically by means 90, such as a shaft or push rod. The switch operates to place the capacitor 84 across the probe 28. At the same time the timer operates a switch 92 to connect the low frequency input impedance 18 to the full output of potentiometer 15. Also at the same time, timer 86 operates switch 94 to couple the output of amplifier 50 to a servo motor 96 which operates through means 97, which may be a shaft, to vary the position of a tap 98 on a resistor 100. The tap 98 is positioned like tap 14 of the measuring circuit and causes the full output of the potentiometer 15 to be the appropriate amount necessary to balance the system with pure capacitance across the probe. The system is thus standardized for one standard measurement and other measurements may be made relative thereto by an appropriate relationship between potentiometer 15 and read-out device 56.

At the same time the timer 86 operates a switch 102 which turns on a motor 104 to turn in such direction as to operate a driving means 106, which may be shafts and gears, to withdraw the probe 28 from the material 11 so that the standardization is effected without material at the probe. When so withdrawn, only the standardizing capacitor 84 is connected across the probe, and the standardization is effected without any effect by the material to be measured.

When sufficient time has elapsed to effect standardization, timer 86 operates switches 95, 88, 102 and 92 to place the system in measuring condition. Switch 94 connects servo amplifier 50 to the measuring servo motor 52. Switch 88 disconnects capacitor 84 from across the probe and grounds one side of the capacitor 84. Switch 102 turns on the motor 104 to turn in the opposite direction so as to return the probe to the material to be measured. Swith 92 connects the input impedance 18 to the output taps of potentiometer 15. The measurements then continue automatically until the next standardizing operation initiated by timer 86.

Although certain and specific embodiments have been described herein, modifications may be made thereto without departing from the true spirit and scope of the invention as set forth in the appended claims. For example, it should be noted that although the probe is called a capacitance probe, the dielectric constant of the material being measured may have an imaginary (i.e., resistive) component and the probe electrodes need not be insulated from the material being measured.

I claim:

1. A system for determining a property of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means connected to said measuring probe for deriving a signal comprising a first component related to signals from said probe occasioned by said material at said high frequency and a second component related to signals from said probe occasioned by said material at said low frequency, and means responsive to the difference in amplitude of said first and second components to vary the amplitude of the output of one of said first and second signal generating means whose generated signal is coupled to said measuring probe.

2. A system for determining a property of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means connected to said measuring probe for deriving a signal comprising a first component related to signals from said probe occasioned by said material at said high frequency and a second component related to signals from said probe occasioned by said material at said low frequency, and means responsive to the difference in amplitude of said first and second components to vary the amplitude of the output of one of said first and second signal generating means whose generated signal is coupled to said measuring probe in such direction as to reduce said difference to a minimum.

3. A system for determining a property of dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means connected to said measuring probe for deriving a first D.C. signal related to signals from said probe occasioned by said material at said high frequency and a second D.C. signal of the same polarity related to signals from said probe occasioned by said material at said low frequency, means responsive to the difference in amplitude of said first and second D.C. signals to vary the amplitude of the output of one of said first and second signal generating means whose generated signal is coupled to said measuring probe in such direction as to reduce said difference substantially to zero, and means for indicating the amplitude of said output of said one of said first and second signal generating means as an indication of said property of said dielectric material.

4. A system for determining the moisture content of dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means connected to said measuring probe for deriving a third signal related to signals from said probe occasioned by said material at said high frequency and a fourth signal related to signals from said probe occasioned by said material at said low frequency, and means responsive to the difference in amplitude of said third and fourth signals to vary the amplitude of the output of one of said first and second signal generating means whose generated signal is coupled to said measuring probe, so as to reduce said difference substantially to zero, and means for indicating the amplitude of said output of said one of said first and second signal generating means as an indication of said moisture content of said dielectric material.

5. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means connected to said measuring probe for deriving a third signal related to signals from said probe occasioned by said material at said high frequency and a fourth signal related to signals from said probe occasioned by said material at said low frequency, potentiometer means connected at the output of said one of said first and second signal generating means, means responsive to the difference in amplitude of said third and fourth signals to move said potentiometer means to vary the output of said one of said first and second signal generating means at said potentiometer so as to reduce said difference substantially to zero, read-out means responsive to the position of said potentiometer means for indicating the moisture content of said dielectric material, temperature sensing means for sensing the temperature at said probe, and means responsive to said temperature sensing means for adjusting the characteristic of said potentiometer means, whereby said characteristic is made applicable to measurements made at said temperature.

6. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means connected to said measuring probe for deriving a third signal related to signals from said probe occasioned by said material at said high frequency and a fourth signal related to signals from said probe occasioned by said material at said low frequency, first and second potentiometers connected in parallel at the output of one of said first and second signal generating means, each of said first and second potentiometers having a movable output tap mechanically connected to that of the other, temperature sensing means for sensing the temperature at said probe, means responsive to said temperature sensing means for combining the signals appearing on said output taps in a manner dependent upon the temperature at said probe, means responsive to the difference in amplitude of said third and fourth signals to move said movable taps to vary the amplitude of the output of said one of said first and second signal generating means at said output taps so as to reduce said difference substantially to zero, and means responsive to the position of said output taps for indicating the moisture content of said dielectric material.

7. A system for determining the moisture content of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means connected to said measuring probe for deriving a third signal related to signals from said probe occasioned by said material at said high frequency and a fourth signal related to signals from said probe occasioned by said material at said low frequency, first and second potentiometers connected in parallel at the output of one of said first and second signal generating means, each of said first and second potentiometers having a movable output tap mechanically connected to that of the other, a third potentiometer electrically connected between said movable output taps, said third potentiometer having a third movable output tap, means responsive to the difference in amplitude of said third and fourth signals to move said first and second movable taps to vary the amplitude of the output of said one of said first and second signal generating means at said third tap so as to reduce said difference substantially to zero, readout means responsive to the position of said taps of said first and second potentiometers for indicating the moisture content of said dielectric material, temperature sensing means for sensing the temperature at said probe, and means responsive to said temperature sensing means for moving said third movable output tap in a manner dependent upon the temperature at said probe.

8. Apparatus for quantitative determination of at least one property of a dielectric material by measurement of a function of the dielectric properties of said material, said apparatus comprising a plurality of sources of electrical signals at different respective frequencies, detecting means, and capacitive probe means having spaced electrodes arranged for applying electrical signals from said sources to at least a portion of said material and at the same time coupling said detecting means to said portion, said detecting means including means for deriving separate signals each systematically related to the signals applied from a respective source and to the mass of said material and the dielectric properties of said material at the frequency of that source, means for combining said separate signals to produce a continuous resultant signal that is a function of the ratio of said separate signals, and means responsive to said resultant signal for varying the amplitude of the output of one of said sources of said electrical signals applied by said probe to said material.

9. Apparatus for quantitative determination of at least one property of a dielectric material by measurement of a function of the dielectric properties of said material, said apparatus comprising a plurality of sources of electrical signals at different respective frequencies, detecting means, and capacitive probe means having spaced electrodes arranged for applying electrical signals from said sources to at least a portion of said material and at the same time coupling said detecting means to said portion, said detecting means including means for deriving separate signals each systematically related to the signals applied from a respective source and to the mass of said material and the dielectric properties of said material at the frequency of that source, means for combining said separate signals to produce a continuous resultant signal that is a function of the ratio of said separate signals, and means responsive to said resultant signal for varying the amplitude of the output of one of said sources of said electrical signals applied by said probe to said material, in such direction as to maintain said ratio constant.

10. Apparatus for quantitative determination of the moisture content of a dielectric material by measurement of a function of the dielectric properties of said material, said apparatus comprising a plurality of sources of electrical signals at different respective frequencies, detecting means, and capacitive probe means having spaced electrodes arranged for applying electrical signals from said sources to at least a portion of said material and at the same time coupling said detecting means to said portion, said detecting means including means for deriving separate signals each systematically related to the signals applied from a respective source and to the mass of said material and the dielectric properties of said material at the frequency of that source, means for combining said separate signals to produce a continuous resultant signal that is a function of the ratio of said separate signals, means responsive to said resultant signal for varying the amplitude of the output of one of said sources of said electrical signals applied by said probe to said material, in such direction as to maintain said ratio constant at unity, and means for indicating the amplitude of said output of said one of said sources of electrical signals as an indication of said moisture content of said dielectric material.

11. Apparatus for quantitative determination of at least one property of a dielectric material by measurement of a function of the dielectric properties of said material, said apparatus comprising a plurality of sources of electrical signals at different respective frequencies, detecting means, and capacitive probe means having spaced electrodes arranged for applying electrical signals from said sources to at least a portion of said material and at the same time coupling said detecting means to said portion, said detecting means including means for deriving separate signals each systematically related to the signals applied from a respective source and to the mass of said material and the dielectric properties of said material at the frequency of that source, means for combining said separate signals to produce a continuous resultant signal that is a function of the ratio of said separate signals, timing means for automatically and periodically withdrawing said probe means from said material and at the same time connecting a capacitor between said electrodes, means responsive to said resultant signal for automatically varying the amplitude of the output of one of said sources of electrical signals in such direction as to make said ratio unity while said capacitor is connected between said electrodes, and means responsive to said resultant signal for indicating said property while said material is at said probe means.

12. Apparatus for quantitative determination of at least one property of a dielectric material by measurement of a function of the dielectric properties of said material, said apparatus comprising a plurality of sources of electrical signals at different respective frequencies, detecting means, and capacitive probe means having spaced electrodes arranged for applying electrical signals from said sources to at least a portion of said material and at the same time coupling said detecting means to said portion, said detecting means including means for deriving separate signals each systematically related to the signals applied from a respective source and to the mass of said material and the dielectric properties of said material at the frequency of that source, means for combining said separate signals to produce a continuous resultant signal that is a function of the ratio of said separate signals, means for withdrawing said probe means from said material and at the same time connecting a capacitor between said electrodes, means responsive to said resultant signal for automatically varying the amplitude of the output of one of said sources of electrical signals in such direction as to make said ratio unity, and means for indicating the output of one of said sources of electrical signals when said material is at said probe means relative to the output thereof when said capacitor is connected between said electrode as an indication of said property.

13. A system for determining a property of a dielectric material comprising: a measuring probe having spaced electrodes for coupling said probe to said material, first signal generating means for generating a high frequency signal, second signal generating means for generating a low frequency signal, means for coupling one of said signals to said probe, means for separating the other of said signals into a reference portion and a variable portion, means for coupling said variable signal portion to said probe, means coupled to said probe for providing a composite signal comprising a first component related to signals from said probe occasioned by said material at said high frequency and a second component related to signals from said probe occasioned by said material at said low frequency, means responsive to a difference in amplitude of said first and second components for adjusting the magnitude of said variable portion of said other signal to maintain said difference substantially constant, means for indicating the amplitude of said variable portion as a measure of said property of said dielectric material, means for withdrawing said probe from said material and for coupling said reference portion of said other signal to said probe in substitution for said variable portion whereby said first and second components of said composite signal are related to signals from said probe in the absence of said material thereat, and means responsive to a difference in amplitude of said components with said probe withdrawn for adjusting the magnitude of said other signal to restore said last-mentioned difference to a predetermined value.

14. A system for determining a property of a dielectric material comprising: a measuring probe having spaced electrodes for coupling said probe to said material, first signal generating means for generating a high frequency signal, second signal generating means for generating a low frequency signal, means connected to said first and second signal generating means for coupling said high and low frequency signals to said measuring probe, means coupled to said measuring probe for deriving a signal comprising a first component related to signals from said probe occasioned by said material at said first frequency and a second component related to signals from said probe occasioned by said material at said second frequency, means responsive to the difference in amplitude of said first and second components to vary the amplitude of the output of one of said first and second signal generating means, means for indicating said property as a variable function of said amplitude of said one of said first and second signal generating means, temperature sensing means, and means responsive to said temperature sensing means for varying said function of amplitude to make the indicated value of said property substantially independent of temperatue changes.

References Cited by the Examiner

UNITED STATES PATENTS

| | | | |
|---|---|---|---|
| 2,718,620 | 9/1955 | Howe | 324—57.2 |
| 3,111,845 | 11/1963 | Prigozy | 324—61 X |
| 3,169,220 | 2/1965 | Holdo | 324—140 |

FOREIGN PATENTS 217,898  10/1958  Australia.

FREDERICK M. STRADER, *Primary Examiner.*

WALTER L. CARLSON, *Examiner.*